US010346276B2

(12) United States Patent
Spradlin

(10) Patent No.: US 10,346,276 B2
(45) Date of Patent: Jul. 9, 2019

(54) KERNEL AWARENESS OF PHYSICAL ENVIRONMENT

(75) Inventor: Jeremiah Spradlin, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 46 days.

(21) Appl. No.: 12/970,935

(22) Filed: Dec. 16, 2010

(65) Prior Publication Data

US 2012/0159143 A1    Jun. 21, 2012

(51) Int. Cl.
*G06F 1/30* (2006.01)
*G06F 11/30* (2006.01)

(52) U.S. Cl.
CPC .............. *G06F 11/3058* (2013.01)

(58) Field of Classification Search
USPC .............. 713/100, 300; 455/456.1
See application file for complete search history.

(56) References Cited

U.S. PATENT DOCUMENTS

| | | | |
|---|---|---|---|
| 6,649,994 B2 | 11/2003 | Parsons | |
| 7,072,956 B2 | 7/2006 | Parupudi et al. | |
| 7,296,271 B1 * | 11/2007 | Chalmer et al. | 718/108 |
| 7,400,878 B2 | 7/2008 | Hassan et al. | |

(Continued)

FOREIGN PATENT DOCUMENTS

| | | |
|---|---|---|
| CN | 101379562 A | 3/2009 |
| CN | 101464722 A | 6/2009 |

(Continued)

OTHER PUBLICATIONS

Kon. F. et al. 2K : A Reflective, Component-Based Operating System for Rapidly Changing Environments, Lecture Notes in Computer Science, 1998, vol. 1543 In: Object-Oriented Technology: ECOOP' 98 Workshop Reader.

(Continued)

*Primary Examiner* — Zahid Choudhury
(74) *Attorney, Agent, or Firm* — Ray Quinney & Nebeker, P.C.; Thomas M. Hardman; Daniel Choi

(57) ABSTRACT

Techniques to implement physically aware kernels are described. A kernel or operating system controlling resources and processing on a computer is rendered environmentally aware. The physical environment of a computer is measured by one or more sensors. The measurements or observations are evaluated. When a pre-specified environmental condition exists according the measurements or observations, the kernel is adapted accordingly. The core behavior of the kernel, such as how it manages memory or how it manages processes, is modified in light of sensed environmental conditions. That is, kernel-level functionality, as opposed to user-space application code, is modified in response to specific environmental conditions. An embodiment may have a policy engine that monitors sensor observations and an enforcement module that reaches into the kernel to modify the kernel based on conclusions reached by the policy engine. In another embodiment, the kernel itself stores, monitors, and responds to environment data.

14 Claims, 8 Drawing Sheets

(56) References Cited

U.S. PATENT DOCUMENTS

| | | | |
|---|---|---|---|
| 2002/0065049 A1* | 5/2002 | Chauvel | G06F 1/206 455/550.1 |
| 2002/0125886 A1 | 9/2002 | Bates et al. | |
| 2004/0139302 A1* | 7/2004 | Flautner et al. | 712/220 |
| 2004/0236718 A1* | 11/2004 | Primm | 707/1 |
| 2005/0049729 A1* | 3/2005 | Culbert et al. | 700/50 |
| 2005/0120252 A1* | 6/2005 | Uwatoko | G06F 1/206 713/300 |
| 2006/0238339 A1* | 10/2006 | Primm et al. | 340/540 |
| 2007/0005363 A1 | 1/2007 | Cucerzan et al. | |
| 2007/0005572 A1* | 1/2007 | Schluessler et al. | 707/3 |
| 2007/0159455 A1 | 7/2007 | Lin | |
| 2008/0098254 A1* | 4/2008 | Altevogt et al. | 713/600 |
| 2008/0162555 A1* | 7/2008 | Schuler et al. | 707/104.1 |
| 2008/0218501 A1 | 9/2008 | Diamond | |
| 2008/0253015 A1* | 10/2008 | Harrington | 360/75 |
| 2009/0055739 A1 | 2/2009 | Murillo et al. | |
| 2009/0163226 A1 | 6/2009 | Burges et al. | |
| 2009/0195350 A1* | 8/2009 | Tsern et al. | 340/3.1 |
| 2009/0267780 A1 | 10/2009 | Van Hoff et al. | |
| 2009/0271608 A1* | 10/2009 | Gooding | G06F 1/206 713/100 |
| 2010/0037073 A1* | 2/2010 | Huizenga et al. | 713/320 |
| 2010/0042826 A1* | 2/2010 | Bull et al. | 713/100 |
| 2010/0153680 A1 | 6/2010 | Baum et al. | |
| 2010/0211594 A1 | 8/2010 | Penders et al. | |
| 2010/0318793 A1* | 12/2010 | Manoharan et al. | 713/164 |
| 2011/0093691 A1* | 4/2011 | Galicia et al. | 713/2 |

FOREIGN PATENT DOCUMENTS

| | | |
|---|---|---|
| CN | 101876950 A | 11/2010 |
| JP | 04337836 A | 11/1992 |
| JP | H05282168 A | 10/1993 |
| JP | 2004164642 A | 6/2004 |
| JP | 2004530196 A | 9/2004 |
| JP | 2009153123 A | 7/2009 |
| JP | 2010277581 A | 12/2010 |
| KR | 10-2008-0052320 | 6/2008 |
| KR | 1020080052320 A | 6/2008 |
| TW | 200907208 | 12/2003 |
| WO | 2008050512 A1 | 5/2008 |

OTHER PUBLICATIONS

Blandford, Rafe., ""The future of the operating system" by rate blandford, all about symbian", Retrieved at <<http://conversations.nokia.com/2010/04/08/the-future-of-the-operating-system-by-rafe-blandford-all-about-symbian/>>, Retrieved Date: Oct. 13, 2010, pp. 11.

Frohlich, et al., "Operating system support for wireless sensor networks", Retrieved at <<http://www.scipub.org/fulltext/jcs/jcs44272-281.pdf>>, Journal of Computer Science, vol. 4, No. 4, 2008, pp. 272-281.

Baldauf, et al., "A Survey on context-aware systems", Retrieved at <<http://www.ist-music.eu/MUSIC/docs/baldauf-survey-04.pdf>>, International Journal of Ad Hoc and Ubiquitous Computing, vol. 2, No. 4, Jun. 2007, pp. 1-15.

Chen, et al., "A survey of context-aware mobile computing research", Retrieved at <<http://citeseerx.ist.psu.edu/viewdoc/download?doi=10.1.1.33.3717&rep=rep1&type=pdf>>, Dartmouth Computer Science Technical Report TR2000-381, Nov. 2000, pp. 1-16.

Kon, et al., "2K: A Reflective. Component-Based Operating System for Rapidly Changing Environments" in the proceedings of ECOOP'98, 1998, pp. 1-13.

"International Search Report", dated Jun. 28, 2012, Application No. PCT/US2011/064033, Filed Date Dec. 8, 2011, pp. 9.

"First Office Action and Search Report Issued in Chinese Patent Application No. 201110440204.3", dated Mar. 5, 2014, 14 Pages.

"Second Office Action Received for China Patent Application No. 201110440204.3", dated Nov. 4, 2014, 13 Pages.

"Office Action Issued in Chinese Patent Application No. 201110440204.3", dated May 6, 2015, 10 Pages.

Third Office Action, China Application No. 201110440204.3, dated Nov. 2, 2015.

"Office Action Issued in Japanese Patent Application No. 2013-544579", dated Dec. 8, 2015, 5 Pages.

Office Action Issued in Taiwanese Application No. 100141897.

Taiwan Search Report for Application No. 100141897, completed on Jan. 14, 2016.

Final Chinese Office Action cited in Chinese Application No. 201110440204.3 dated Jul. 5, 2016, 11 pgs.

"Office Action Issued in Japanese Patent Application No. 2013-544579", dated Jul. 12, 2016, 2 Pages.

Taiwanese Notice of Allowance cited in Taiwan Application No. 100141897 dated May 9, 2016, 4 pgs.

Reply fourth Chinese Office Action cited in Chinese Application No. 201110440204.3 dated Apr. 18, 2016, 11 pgs.

"Fourth Office Action Issued in Chinese Patent Application No. 201110440204.3", dated Feb. 3, 2016, 12 Pages.

"Office Action Issued in Japanese Patent Application No. 2013-544579", dated Dec. 6, 2016, 5 Pages.

"Office Action Issued in Argentina Patent Application No. P110104454", dated Nov. 1, 2016, 7 Pages.

Reply Final Chinese Office Action cited in Chinese Application No. 201110440204.3 dated Oct. 20, 2016, 12 pgs.

"Office Action Issued in Korean Patent Application No. 10-2013-7014991", dated May 23, 2017, 11 Pages.

"Office Action Issued in Chinese Patent Application No. 201110440204.3", dated May 11, 2017, 10 Pages.

Argentine Search Report cited in Argentine Application No. P 11 01 04454 dated Jan. 24, 2017, 4 pgs.

"Supplementary Search Report Issued in European Patent Application No. 11848607.5", dated Oct. 4, 2017, 8 Pages.

"Office Action Issued in Japanese Patent Application No. 2017-075060", dated Nov. 27, 2018, 5 Pages.

"Office Action Issued in Korean Patent Application No. 10-2013-7014991", dated Dec. 11, 2017, 12 Pages.

"Office Action Issued in Japanese Patent Application No. 2017-075060", dated Mar. 27, 2018, 13 Pages.

"Office Action Issued in Korean Patent Application No. 10-2013-7014991", dated Jun. 28, 2018, 5 Pages.

"Office Action Issued in Korean Patent Application No. 10-2013-7014991", dated Sep. 3, 2018, 7 Pages.

"Office Action Issued in European Patent Application No. 11848607.5", dated Jan. 31, 2019, 7 Pages.

\* cited by examiner

```
                                200
202 ─┐  ┌<Sensors>
     └──│    <sensor>
        │        <name></name>
        │        <PollingFrequency></PollingFrequency>
        │        <DataType></DataType>
        │    </sensor>
        │    ...
        │</Sensors>
204 ─┐  │<Enforcement>
     └──│    <GlobalRules>
        │    </GlobalRules>
        │    <ActionDefinitions>
206 ─┐  │    </ActionDefinitions>
     └──│</Enforcement>
        │<Policies>
178 ─────── <Policy>
207 ──────────── <Rule>
                      <Condition></Condition>
208 ─────────────────<Action></Action>
210 ─────────── </Rule>
                 </Policy>
                 <Policy>
                 ...
                 </Policy>
                 ...
                 </Policies>
```

```
...
<Sensor><name>GPS</name><datatype>Coordinate</Datatype>
    <frequency>5ms</frequency>
</Sensor>
<Sensor><name>OutdoorTemp</name><datatype>Int</Datatype>
    <frequency>60sec</frequency>
</Sensor>
<Sensor><name>AngularSpeed</name><datatype>Float</datatype>
    <frequency>1ms</frequency>
</Sensor>
<Sensor><name>MagneticFlux</name> <datatype>Float</datatype>
    <frequency>500ms</frequency>
</Sensor>
...
<Policy>
    <Rule>
    <Condition>If GPS.Lat.Cur - GPS.Lat.Cur > 10^-5 </Condition>
    <Action>IO.Pause(60)</Action>
    </Rule>
</Policy>
<Policy>
    <Rule>
    <Condition>MagneticFlux > 100 </Condition>
    <Action>DiskCache.Flush</Action>
    </Rule>
</Policy>
178 — <Policy>
    <Rule>
    <Condition>OutdoorTemp < 0</Condition>
    <Action>CPU.Increase(1)</Action>
    </Rule>
    <Rule>
    <Condition>OutdoorTemp > 100 </Condition>
    <Action>Power.Suspend</Action>
    </Rule>
</Policy>
<Policy>
    <Rule>
    <Condition>
    CPU.Idle > 95% AND Memory.Usage < 50% AND
        AngularSpeed < 5
    </Condition>
    <Action>ThreadScheduler.Mode = 10</Action>
    </Rule>
</Policy>
```

FIG. 5

KERNEL AWARENESS OF PHYSICAL ENVIRONMENT

BACKGROUND

Modern operating systems evolved from the need to run different programs on the same hardware and the desire to maximize utilization of a computer's hardware resources. While it is possible to run user or application programs directly on a processor when a processor first starts processing (so-called "bare metal"), it became apparent that it is inefficient to rewrite and reload, for each new program, the same type of control code to perform the same basic functions such as marshalling the hardware resources of the computer, determining which instructions to load, handling certain types of system faults, and so on. Moreover, it became desirable to increase utilization of a computer's hardware resources; an expensive computer would often go unused as different users reset the computer and loaded their individual programs. For these reasons and others, specialized programs called operating systems were developed.

Operating systems today continue to be designed as special software that aims to efficiently and securely manage the hardware resources of a computer based only on the inherent capabilities and state of those resources. As such, operating systems have been designed only around the inherent computational environment of the host itself. Functionality and algorithms for efficient utilization of resources, optimal computational speed, reliability, etc., have depended only on input and information about the host computer itself. That is to say, core operating system behavior and functionality has only been "aware of" or informed by information about the state of the computer. Functions such as task scheduling, memory protection and allocation, control of access to resources, and management of peripheral devices, have all turned on information (including semantic information) about the computational hardware and software state of the host.

The host-centric design principles and objectives of modern operating systems might reflect the fact that the modern operating system was largely developed before it was common for computers to be mobile. As such, operating systems have only been aware of the virtual environment of the host computer itself. While the miniaturization of computers has increased their mobility and range of uses, their operating systems have remained focused on the virtual environment. Laptop computers, mobile devices, and embedded devices are now used in places and ways not anticipated as operating systems evolved. For example, computers are often the nerve centers of vehicles or robots. Mobile computers may experience changes in physical environment. Scientists and military personnel may use computers in demanding field conditions, yet information about the physical environment of the host computer (temperature, humidity, air pressure, location, speed, etc.) has not been directly used by operating systems.

Despite these changes, operating systems have not been designed to perform their primary functions in ways that take into account the dynamic physical environment of the host computer's immediate vicinity. Even as operating systems have evolved and increased in complexity and in variety of design, they have remained conceptually concerned only with the virtual or abstract computation environment to execute instructions, facilitate the interaction of applications with external peripherals, and so on. Any interaction with or information about the existence of the physical world has been dealt with by a computer only through specific applications that interact with specific peripherals. Such applications typically reside in user space (not kernel space) and usually deal with information about the immediate physical environment for some specific purpose not related to the operating system per se. Moreover, user-space applications do not change the behavior of the kernel or operating system itself.

As noted above, computers have become mobile. Computers and their operating systems are going places and being used in ways not anticipated during the evolution of operating systems. For instance, a device with a GPS (Global Positioning System) component might be traveling along a freeway at high speeds, a factory automation robot might be moving through physically hostile environments, a terminals in the field may experience excessive heat or cold. The operating systems controlling these computing devices have no awareness of the changing physical environment within which they execute.

Techniques related to operating systems with awareness of their physical environment are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques to implement physically aware kernels are described below. A kernel or operating system controlling resources and processing on a computer is rendered environmentally aware. The physical environment of a computer is measured by one or more sensors. The measurements or observations are evaluated. When a pre-specified environmental condition exists according the measurements or observations, the kernel is adapted accordingly. The core behavior of the kernel, such as how it manages memory or how it manages processes, is modified in light of sensed environmental conditions. That is, kernel-level functionality, as opposed to user-space application code, is modified in response to specific environmental conditions. An embodiment may have a policy engine that monitors sensor observations and an enforcement module that reaches into the kernel to modify the kernel based on conclusions reached by the policy engine. In another embodiment, the kernel itself stores, monitors, and responds to environment data.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 4 shows a policy file.

FIG. 5 shows an example policy file.

DETAILED DESCRIPTION

Embodiments discussed below relate to operating systems that are aware of and adapt to the physical environment of their host computers. Discussion will begin with an overview of a design concept for operating systems that takes into account physical environment. Particular embodiments to implement the design are then described. Embodiments using a policy and enforcement model will be described next. Details of how policy can be formulated and used will be covered, followed by discussion of operating systems in which core functions of an operating system have direct environmental awareness and self-adapt to changing environmental conditions.

Figure 1:
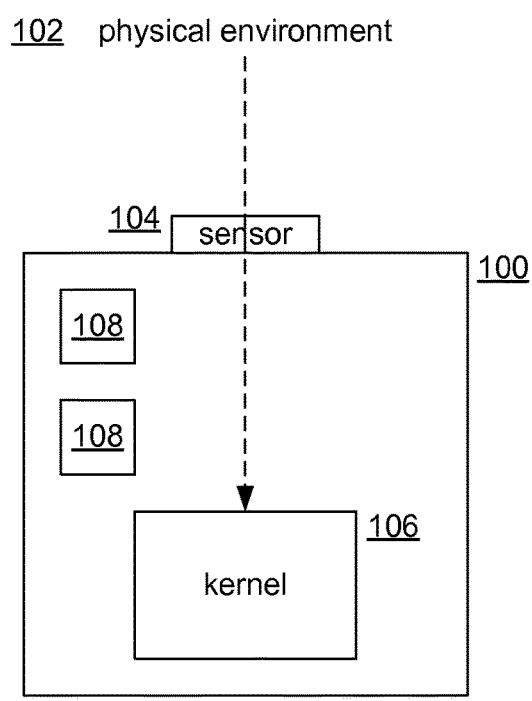
FIG. 1 shows an environmentally aware operating system design.

FIG. 1 shows an environmentally aware operating system design. A computer 100 resides in a physical environment 102. The computer 100 may be any type of computing device with a processor, storage such as memory that is used in conjunction with the processor, input and output facilities, and so on. The computer 100 may have any form or purpose, and may be an embedded device, a mobile handheld device, a laptop, a monitor-less device integrated with a vehicle or mobile machine, a personal computer in motion or exposed to dynamic environmental conditions, or any other type of computer. The physical environment 102 need not be outdoors or changing due to mobility. The physical environment 102 will be considered herein to be the immediate vicinity of the computer 100.

The computer 100 is equipped with one or more physical sensors 104. Each physical sensor 104 senses a measurable aspect of the physical environment 102. A physical sensor 104 might be of any type, for example any of the following: a temperature sensor, a motion sensor, a geographical location sensor (e.g., a GPS device), a rotation or inertia sensor (e.g., a gyroscope), a piezoelectric sensor, an air pressure sensor, an accelerometer, a humidity sensor, a light sensor, a magnetic field sensor, a sub-atomic particle detector, a radiation sensor, a power consumption sensor, a seismic sensor, an atmospheric content sensor, a voltage input sensor, and so on.

The computer 100 also has a kernel 106, which is part of an operating system that controls the computer. The kernel 106 may be based on any type of known kernel, for example, a monolithic kernel, a microkernel, a hybrid of both, an embedded kernel, a real-time kernel, or others. Moreover, the kernel 106 may be a hypervisor or may be a management operating system that manages the execution of a hypervisor, which in turn hosts virtual machines. As will be discussed below, the kernel 106 has various functions typically performed by any kernel, but unlike prior kernels, those functions are adapted to the physical environment of the computer 100.

Figure 2:
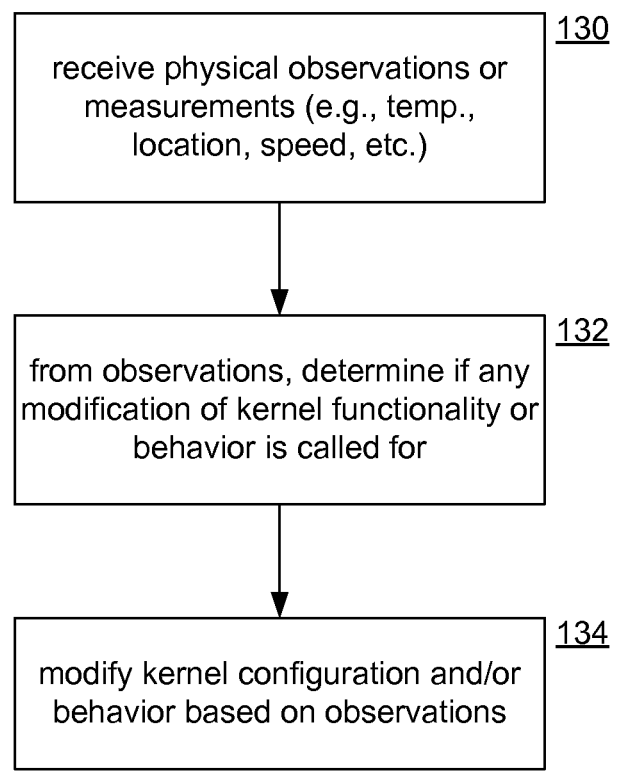
FIG. 2 shows a process for adapting a kernel to the physical environment of its host computer.

FIG. 2 shows a process for adapting kernel 106 to the physical environment 102 of its host computer 100. Conceptually, the physical environment 102 informs the behavior of the kernel 106. That is, functionality of the kernel 106 adapts as changes in the physical environment 102 are sensed and identified. Specifically, at step 130, by various means described below, readings or data from a physical sensor 104 are received. The readings may need to be filtered for noise, interpreted, and perhaps passed to a policy engine by way of a local protocol. At step 132, the observations are compared against predefined or user-specified conditions to determine if any modification of kernel or operating system functionality is called for.

At step 134, when it has been determined from an observation that a specific environmental condition exists, the behavior or functionality of the operating system, and in particular, kernel 106, is modified. The modification of kernel 106 may affect one of its core functions as manager of the computer 100 and mediator between the hardware of the computer 100 and applications 108 running on the computer 100. Thus, the behavior of the kernel 106 itself is sensitive to the physical environment 102. This is to be distinguished from mere activity of a kernel handling applications (e.g., scheduling, memory allocation, etc.) that are environmentally informed. Furthermore, the nature of the modification can vary. The algorithms that the kernel 106 uses can be altered, replaced, etc. Kernel state that affects such algorithms may also be modified in response to conditions of the physical environment. In sum, the kernel 106 is modified in a way that affects how it performs its role as executive and controller of resources.

For understanding, some example adaptations will be mentioned. Details such as specification of conditions and actions, and mechanisms of enforcement, will be described below. When a temperature value is sensed above a certain threshold, the behavior of the operating system or kernel 106 is adjusted so that the CPU performs fewer operations or operates at a slower rate, perhaps by culling some maintenance procedures or lowering process priorities, or by using a power saving feature such as SpeedStep™ to lower the voltage supplied to the CPU. When a sudden change in speed is detected, the kernel 106 might block any writing to hard disks by preventing any disk flushes and queuing new writes to files. When certain levels of radiation are detected, the kernel 106 may alter its memory management routines to make use of error correction codes to mitigate radiation induced bit reversals. When temperature is above or below predefined thresholds (indicating that the computer is outdoors), a security parameter of the kernel 106 may be adjusted to increase security. When a combination of environmental conditions are detected, the kernel 106 may reprioritize I/O (input/output) operations for specific designated processes or devices. In response to determining that the computing device is currently being subjected to constant acceleration/force (as might occur within a centrifuge or a spinning vehicle), there may be a change in thread or task scheduling algorithms, thus changing the way that the operating system schedules execution units.

The conditions for adjusting the functions of an operating system can also include operating system conditions. The functions of an operating system can be adjusted based on the environment conditions in combination with the operating system conditions. Such information available from the operating system can be CPU idle time, total memory usage, time since user input, number of active threads or contexts, number of open files, active network connections, whether there are pending interrupts, and so on. Generally, an environmental condition may be given significance only when a certain operating system condition exists. For example, a condition such as "temp>80 and CPU usage<50" can be used as a trigger for an action such as "reduce CPU speed by one increment". Or, "if memory used<50 MB and speed>30, then increase disk cache size by X". As another example, "if Memory.pagefaults>10/sec and humidity>80, then Processor.allocation=mode2". Any Boolean expression using a combination of sensed physical environment values and system values can be specified and associated with some action to be taken when the Boolean expression is satisfied.

Figure 3:
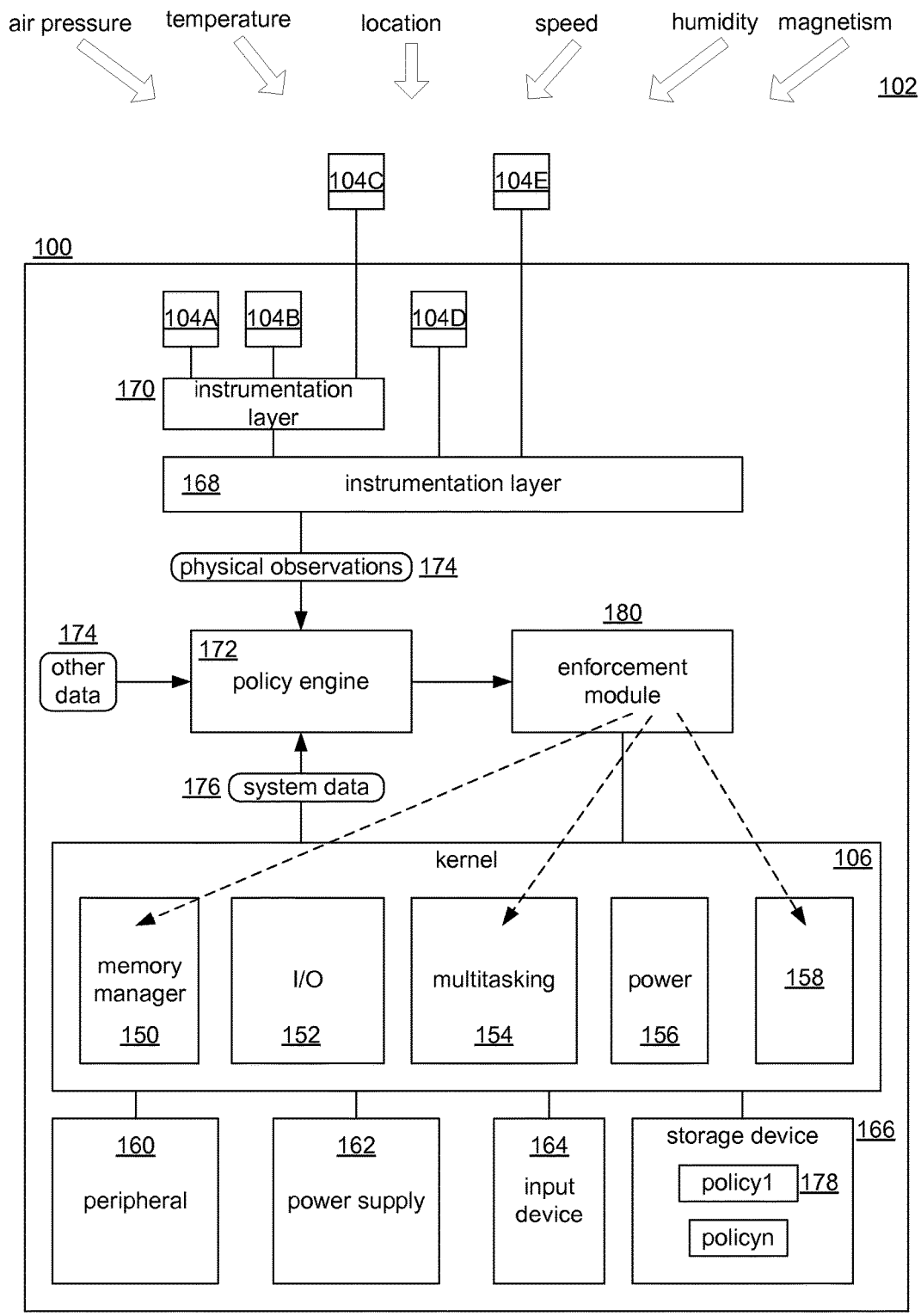
FIG. 3 shows a detailed embodiment.

FIG. 3 shows a detailed embodiment. The kernel 106 may perform any of a variety of known core functions. The kernel 106 may have a memory manager 150, an I/O control module 152, a multitasking module 154 to handle creation of processes and their sharing of the CPU. A power manager 156 may perform various power management functions, for instance, related to entering different power states such as a sleep state, a shutdown state, or an idle state. Various other functions or modules 158 may provide other known kernel functions, such as object management, filesystem management, streams processing, and other known functions.

The various kernel 106 functions may control access to and from various hardware components of the computer 100. Such known hardware components, in one embodiment, might include a peripheral device 160 such as a graphics card or display adapter, a power supply 162, an input device 164, a storage device 166 such as volatile storage (e.g., memory) and/or non-volatile storage (e.g., disk drives). Of course, the computer 100 may have a processor (not shown) that runs the kernel 106, and which is also another hardware resource controlled by the kernel 106.

In addition to the kernel 106 and hardware components, the computer 100 is provided with a system for detecting and responding to sensed aspects of the physical environ 102. As mentioned a variety sensors 104A, 104B, 104C, 104D, 104E may be part of the computer 100. The sensors 104A-104E may sense temperature, location, types of motion, atmospheric pressure, magnetic fields, charged or subatomic particles, atmospheric gases, gravity, etc. Note that only one type of sensor is needed. Moreover, some sensors, such as sensor 104C and 104E may be outside the computer 100, or may be inside or integrated with the computer 100, such as sensors 104A, 104B, and 104D. A sensor need not be a hardware part of the computer 100, but rather the computer 100 may receive readings communicated by sensors in the same local physical environment 102 as the computer 100.

The environmental adaptation system also includes various software components. An instrumentation layer 168 executes on the computer 100. The instrumentation layer 168 is a layer that abstracts data from sensors 104A-104E. That is, the instrumentation layer 168 may have logic for communicating with each type of sensor 104A-104E, perhaps by communicating with device drivers of the respective sensors 104A-104E. The instrumentation layer 168 may also use receive environmental readings through an existing instrumentation layer 170 provided natively with the operating system or through a plug-and-play interface. The instrumentation layer 168 may also, through configuration settings, have information about which sensors are connected and how they communicate. With this information, the instrumentation layer 168 may convert and encapsulate the sensor readings into a common format for communication with a policy engine 172. The policy engine 172 may run in kernel space with a relatively high priority (for example, with a high priority interrupt) to allow rapid intervention. The encapsulated physical observations 174 are passed to the policy engine 172. A physical observation 174 may have a form such as name-value pairs, where a name or identifier identifies the source of the observation (e.g., a number or name identifying sensor 104C) and includes a value corresponding to a physical reading from a corresponding sensor. An encapsulated physical observation 174 might also have a flag indicating the data type of the included observation value.

The policy engine 172 may implement rules governing behavior of the kernel 106 based on the physical observations 172. Examples of such rules were listed above. The rules evaluated by the policy engine 172 may also take into account other data 174 such as commands or settings received from a local bus or from another computer via a data network. The policy engine 172 may also receive system data 176, such as data about the state of memory, data about disk activity, data about CPU usage, or the like. The policy engine 172 may also cache received physical observations 174 to both allow synthesis of observations into trends in the environment as well as to allow synchronization with corresponding sensors (for instance, when the frequency at which a sensor sends observations differs from the frequency at which the policy engine 172 evaluates rules that use the sensor's observations).

The policy engine 172 may also execute one or more libraries (not shown). A library might implement user-programmed high level functions, which can be invoked by rules. For example, a function might map geographic locations (as provided in a physical observation 174) to other data, such as expected weather conditions for the current location of computer 100. Another function might read a cached sequence of recent location or speed readings and in turn compute a current physical acceleration of the computer 106. Another function might may compute induced electric energy from magnetic observations and speed observations. Generally, the policy engine 172 may execute any code that interprets the physical observations.

The policy engine 172 evaluates rules, where a rule specifies both an environmental condition (some physical condition) and some action to take, where the action generally affects or alters a core behavior of the kernel 106 or its encompassing operating system. Rules may be specified in a policy file or policy statement 178 stored in storage device 166. When the policy engine 172 begins executing, the policy statement 178 is read, parsed, and repeatedly evaluated by the policy engine 172. The policy engine 172 may implement a formal language which includes Boolean expressions. A rule may have some complex or compound Boolean expression (e.g., "(V1+V2)>A AND (C1<C2 OR D1>D2)") where variables store physical observations 174 data, operating system data 176, or other data 174.

A rule is accompanied by an enforcement action, which indicates what step or steps are to be taken to modify the kernel 106. The action is implemented by an enforcement module 180, which either runs in kernel-space (a kernel-privileged memory space) or issues calls to the kernel 106; either is acceptable, although operation in kernel mode may improve performance. The enforcement module 180 may be an application programming interface (API) that provides high-level enforcement action functions invocable by the policy engine 172. For instance, the enforcement module 180 might have a function called "suspend(S)", which suspends various activities of the computer 100 for S seconds by issuing various calls into the kernel 106 and by changing flags or configuration settings that regulate how the kernel 106 operates. Other types of enforcement actions are possible. User mode threads may be frozen or de-prioritized. Any further disk access may be locked. A hibernate or shutdown may be initiated. Power to external peripherals may be cut off. Conversely if the processor is in a low power state on an embedded device the processor can be powered upward while throttling down the low-priority threads so that the device can quickly respond to the actuating stimulus. As discussed above, the behavior of the kernel 106 is controlled based on the physical environment 102 of the computer 100.

FIG. 4 shows a policy file 200. The policy file may have information to configure the policy engine 172 and enforcement module 180. The policy file 200 may contain some markup language code or code in another formal language. There may be a sensor section 202 that declares the different sensors that are providing readings. A sensor declaration might specify a name and data type of the sensor. A polling frequency might also be included, indicating how often the sensor provides new readings, or specifying how often the cached most observation of the sensor is to be read and updated by the policy engine 172. An enforcement section might specify some global rules or might define high-level action or enforcement functions (e.g., the "Suspend(S)" function mentioned above), which can be invoked by any rule's action. A policies section 206 might contain various policies such as policy 178. FIG. 4 shows only an example. There is no requirement to use a markup language, name-value pairs, etc.; there are numerous known ways to describe policy in general.

A policy may have one or more rules 207. A rule 207 may define a condition 208 and an action 210. The condition 208, as mentioned above, is evaluated by the policy engine 172 according to current or recent environmental observations and possibly adjunct data. When rule 207's condition 208 evaluates to true, the corresponding enforcement action 210 is invoked and performed by the enforcement module 180.

FIG. 5 shows an example policy file 230. Various types of sensors are defined, corresponding to physical sensors 104. The policy engine 172 or the instrumentation layer 168 use the sensor definitions to identify which physical sensors 104 to communicate with, how to communicate with them, and how to interpret their observations. The sensor and policy definitions in FIG. 5 are only examples provided for illustration. Note that with the environmental adaptation system, a user can flexibly and easily add new sensors, add or modify policy, specify new rules or actions, dynamically load new operating system components (including kernel components) etc., without having to rebuild the kernel 106. Nonetheless, in one embodiment an enforcement action might cause a reconfiguration of the kernel 106 that requires the operating system to be restarted (perhaps allowing a new component or library to be linked to the kernel 106).

Figure 6:
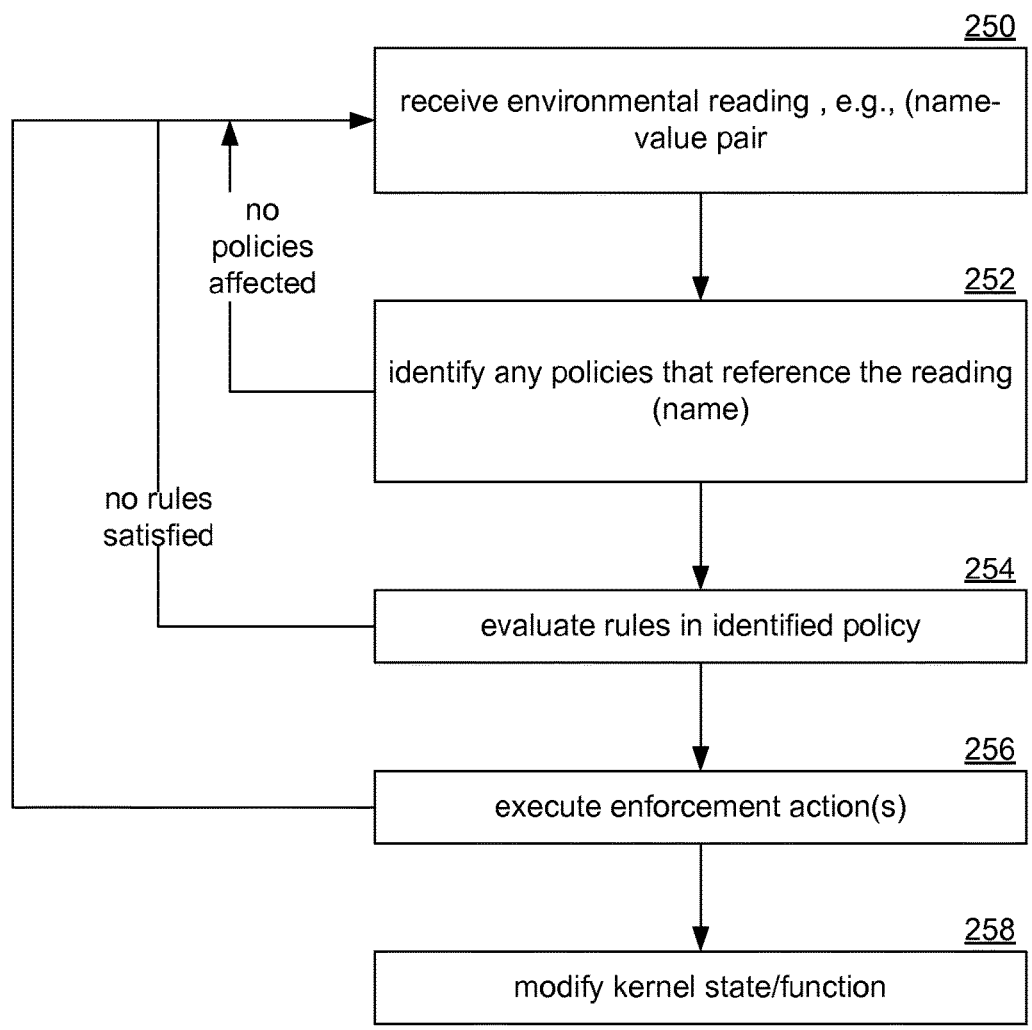
FIG. 6 shows a process corresponding to FIG. 3.

FIG. 6 shows a process corresponding to FIG. 3. At step 250, an environmental observation is received or read, for example, a name-value pair like ("temperature", 100). Step 250 may be performed according to a polling frequency specified for a relevant sensor. Alternatively, step 250 might performed each time a new observation is received from any sensor. At step 252, the process identifies any policies that reference the received reading or observation. For instance, if policy 178 has a rule specifying a condition about outdoor temperature, the policy or rule is identified. At step 254, any identified rules are evaluated. That is, the conditions of the rules are evaluated according to the relevant observation or reading received at step 250. If no rules are satisfied (no conditions are true), then the process returns to step 250. At step 256, for each condition that is evaluated to true, the corresponding action is performed by the enforcement module 180. The result is that at step 258 the state or functionality of the kernel 106 is modified. As mentioned previously, the kernel 106 can be modified in a variety of ways, such as by modifying a configuration parameter of the kernel 106 (perhaps in a registry or configuration file), or by changing some executable code or variables in the kernel-privileged memory space managed by the kernel 106. The effect is that the kernel 106 becomes environmentally aware; the way the kernel 106 controls the computer 100 is modified or adapted to various specified physical conditions of the environment of the computer 100.

Figure 7:
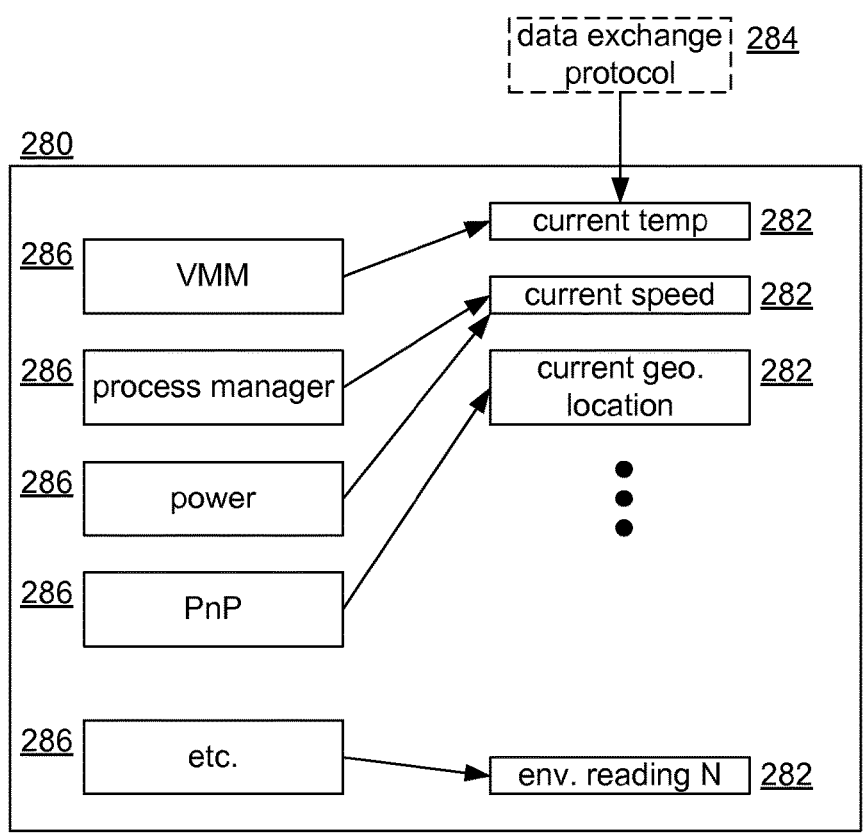
FIG. 7 shows an environmentally aware kernel or operating system.

FIG. 7 shows an environmentally aware kernel 280 or operating system. This embodiment might be suited for embedded systems or for kernels such as micro kernels that are designed to be small and efficient. In this embodiment, rather than using a layer to intermediate between the kernel and physical sensor readings, environmental data is passed into the kernel 280 and stored in registers or memory thereof. In other words, the kernel 280 stores environment data 282 about the current or recent physical environment in which its host computer resides. The environment data 282 may be received via a data exchange protocol 284, which might be implemented on a bus of the host computer. In this embodiment, core functions 286 or services/components of the kernel 280 periodically monitor the environment data or read the environment data 282 in response to interrupts generated when the environment 282 is updated. In one embodiment, shared environmental sensors may communicate data remotely through a network or data link.

The core functions 286 are built such that, in addition to their ordinary system functions, they also have logic to change how they perform such functions based on the environment data 282. Comprehensively, operating system functionality in any of the following can be modified: interrupt handling, thread scheduling, program execution, memory management, device drivers, security objects, networking, and non-volatile storage systems. For instance, a virtual memory manager (VMM) might have a loop that checks a register containing a current temperature, and in response, the VMM changes the memory space, swaps in a new caching algorithm, or temporarily blocks writes to memory space that maps to disk-stored virtual memory, and so on. The kernel might have a component that maintains a small map of core functions 286 and the environment data 282 they respectively access, and possibly also addresses of code portions (e.g., threads) in the respective core functions 286 that are to be executed when associated environment data 282 changes.

Figure 8:
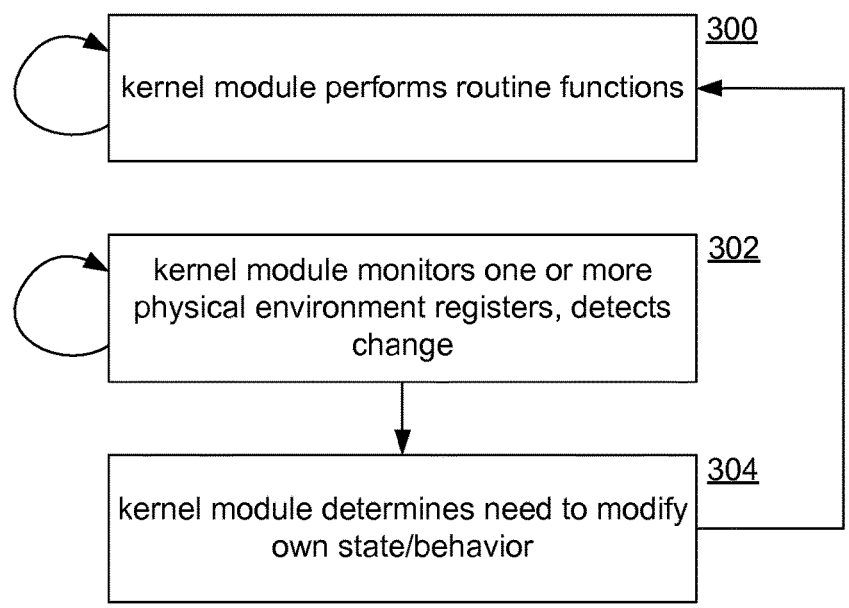
FIG. 8 shows a process corresponding to FIG. 7.

FIG. 8 shows a process corresponding to FIG. 7. At step 300, a kernel module or core function 286 is repeatedly performing its ordinary functions in the kernel 280, such as managing memory, managing executing contexts and processes including deciding which process is to be currently executed, regulating power, handling filesystem activity, and so on. At step 302, a kernel module (either a lightweight monitoring module or a core function 286) monitors the environment data 282 and detects a change therein. At step 304, a core function 286 that is sensitive to the changed environment data 282 determines whether a behavioral adaptation is called for. If a tested-for environmental condition exists, appropriate action is taken, such as by changing a kernel parameter, invoking one or more kernel calls, and so on. With the approach of FIG. 8, the kernel 280, which is closest to the hardware of the computer, can quickly react to environmental conditions that threaten the hardware of the computer. Sudden changes such as spikes in radiation or magnetic induction, rapid acceleration or deceleration, etc., can be responded to quickly by measures such as completely suspending all activity, completely depowering hardware components, safeguarding vulnerable data, increasing data security, and so on.

While various implementations have been described above, the examples are provided for illustration and discussion. The concept of an environmentally aware kernel can be realized in different forms. Moreover, the techniques described herein can be used with any type of operating system or kernel. For example, the techniques may be used with real time operating systems (where the operating system must react to specific events within a specific amount of time), including hard versions (that must respond to events in strict time windows) and soft versions (which allow for some lateness). Regarding kernels, any type of kernel design may be used, for instance, micro-kernels, monolithic kernels, and hybrids.

CONCLUSION

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or other means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of modifying behavior of an operating system that is executing on a device comprising a memory and a processor, the operating system comprising a kernel controlling the processor and a thread scheduler, the method comprising:
executing, by the kernel, instructions that cause the device to:
read a policy specifying an environmental temperature threshold of an environment of the computer;
measure a current environmental temperature outside of the computer;
compare the current environmental temperature with the environmental temperature threshold defined by the policy;
responsive to determining, by the comparing, that the current environmental temperature exceeds the environmental temperature threshold, reduce a task priority of a process to reduce an execution rate of the process by the processor, wherein reducing the task priority and the execution rate of the process also reduce a processor usage of the processor according to the thread scheduler; and
managing the processor according to the processor usage according to the thread scheduler, to reduce heat produced by the computer and to reduce the current environmental temperature toward the environmental temperature threshold.

2. The method according to claim 1, further comprising modifying the policy while the operating system is executing to create a modified policy, wherein the evaluating is performed according to the modified policy.

3. The method according to claim 2, the method further comprising monitoring the current environmental temperature and repeatedly determining whether the current environmental temperature exceeds the environmental temperature threshold.

4. The method according to claim 1, wherein reducing a task priority of a selected task further comprises: suspending the task until the current environmental temperature no longer exceeds the environmental temperature threshold.

5. A computer-readable storage device, storing instructions that, when executed by a kernel of a computer having a processor and a thread scheduler, cause the kernel to:
read a policy specifying an environmental temperature threshold of an environment of the computer;
measure a current environmental temperature outside of the computer;
compare the current environmental temperature with the environmental temperature threshold defined by the policy; and
responsive to determining, by the comparing, that the current environmental temperature exceeds the environmental temperature threshold, reduce a task priority of a process to reduce an execution rate of the process by the processor, wherein reducing the task priority and the execution rate of the process also reduce a processor usage of the processor according to the thread scheduler; and
managing the processor according to the processor usage according to the thread scheduler to reduce heat produced by the computer and to reduce the current environmental temperature toward the environmental temperature threshold.

6. The computer-readable storage device according to claim 5, wherein measuring the current environmental temperature further comprises reading physical sensors of the computer that sense the current environmental temperature outside of the computer.

7. The computer-readable storage device according to claim 5, wherein reducing the task priorities of tasks executed by the kernel further comprises replacing processor-executable instructions of the tasks with new processor instructions that reduce the task priorities of the tasks.

8. The computer-readable storage device according to claim 5, wherein reducing the task priorities of the tasks is performed without regard for any processes or applications running in user-space managed by the kernel of the operating system.

9. The computer-readable storage device according to claim 5, wherein:
the hardware components comprise volatile memory, a non-volatile storage device, and a communications bus, and
at least one task for which the kernel reduces a task priority controls access to or use of one of the hardware components.

10. The computer-readable storage device according to claim 5, wherein the kernel reduces the task priorities of the tasks by interacting with either process or thread scheduling of the operating system, or input/output management of the operating system.

11. The computer-readable storage device according to claim 5, wherein reducing a task priority of a selected task further comprises: suspending the task until the current environmental temperature no longer exceeds the environmental temperature threshold.

12. A device comprising:
an environmental temperature sensor that measures a current environmental temperature outside of the computer;
a memory storing a policy that specifies an environmental temperature threshold of an environment of the computer;
a thread scheduler; and
a processor executing instructions including:
a set of tasks respectively executed according to a task priority; and
an operating system kernel that:
compares the current environmental temperature measured by the environmental temperature sensor with the environmental temperature threshold defined by the policy;
responsive to determining, by the comparing, that the current environmental temperature exceeds the environmental temperature threshold, reduces a task priority of at least one process to reduce an execution rate of the process by the processor, including reducing the task priority of at least one process below an idle processor threshold, wherein reducing the task priority and the execution rate of the processor also reduce a processor usage according to the thread scheduler; and manages the processor according to the processor usage according to the thread scheduler to reduce heat produced by the computer and to reduce the current environmental temperature toward the environmental temperature threshold.

13. The device according to claim 12, wherein:

the policy is modified and re-read after it has been modified while the operating system kernel is operating, thereby creating a modified policy file; and the kernel operates according to the modified policy file.

14. The device according to claim 12, wherein reducing a task priority of a selected task further comprises: suspending the task until the current environmental temperature no longer exceeds the environmental temperature threshold.

\* \* \* \* \*